June 16, 1959 W. H. WANNAMAKER, JR 2,891,220
MEASURING APPARATUS
Filed Oct. 30, 1953
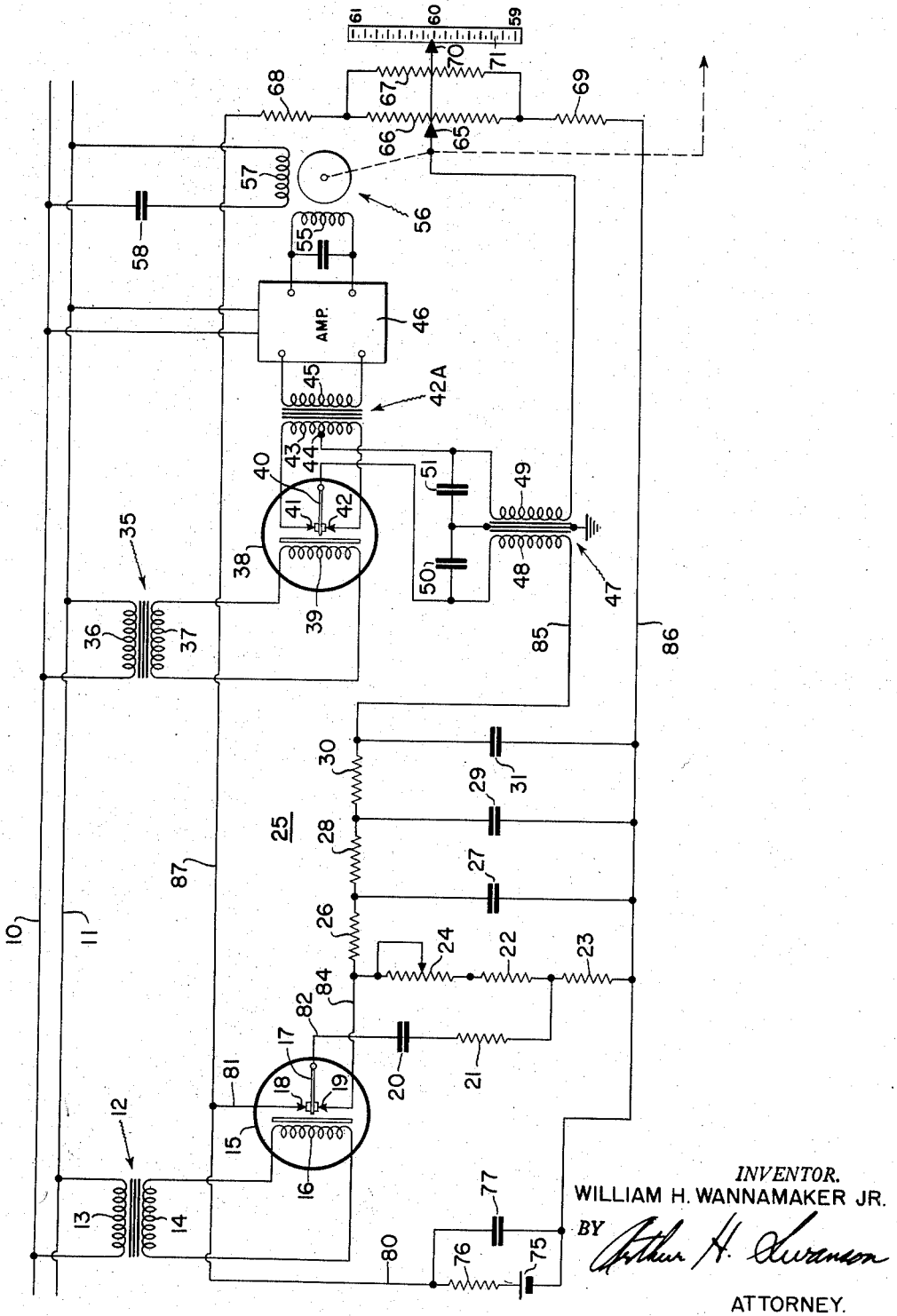
INVENTOR.
WILLIAM H. WANNAMAKER JR.
BY Arthur H. Swanson
ATTORNEY.

United States Patent Office 2,891,220
Patented June 16, 1959

2,891,220

MEASURING APPARATUS

William H. Wannamaker, Jr., Philadelphia, Pa., assignor to Minneapolis-Honeywell Regulator Company, Minneapolis, Minn., a corporation of Delaware Application October 30, 1953, Serial No. 389,217

6 Claims. (Cl. 324—78)

The general object of the present invention is to provide a new and improved frequency measuring apparatus for measuring the frequency of alternations of an alternating current power source. More specifically, the invention is concerned with an alternating current frequency measuring apparatus which is characterized by its simplicity, stability, extreme accuracy, and high sensitivity.

Accurate frequency measurement and control is essential in all power generating stations, particularly those where domestic and commercial time pieces rely upon the generating stations to produce a constant frequency to maintain the time pieces on an accurate time. Heretofore, numerous frequency measuring devices in circuits have been proposed. Where high accuracy has been obtained in the prior art, however, the associated apparatus has been unduly complex and expensive and due to its complexity has been generally unreliable over long periods of time. To the extent that prior art devices have been simple, this simplicity has been gained with an accompanying sacrifice of accuracy, sensitivity, and stability. All of these prior devices have been subject to errors due to wave form or harmonics in the basic wave.

In accordance with the teachings of the present invention, a direct current signal proportional to frequency is produced by an alternating current frequency driven synchronous vibrator whose contacts operate in an appropriate electrical circuit including a charging and discharging condenser. The direct current signal which is produced is appropriately filtered and applied to a suitable potentiometric measuring circuit. While it has been known in the prior art that a switch pulse rate may be used to produce a direct current signal proportional to some variable, there has been no recognition of the applicability of such apparatus to the art of measuring the frequency of an alternating current power source. The present invention is directed to the specific method and means for making an alternating current frequency measuring apparatus which is stable, sensitive, accurate, and simple.

It is therefore a more specific object of the present invention to provide a frequency measuring apparatus using a synchronous alternating current driven contacting vibrator which produces in an associated electrical circuit a direct current signal proportional to the alternating frequency being measured.

A still more specific object of the present invention is to provide a new and improved alternating current frequency measuring apparatus using a synchronous contacting vibrator driven from the alternating current supply to periodically charge and discharge a condenser and produce a direct current signal proportional to the alternating current frequency being measured.

Another more specific object of the present invention is to provide a new and improved alternating current frequency measuring apparatus wherein a condenser is periodically charged and discharged through a resistance circuit by the operation of an alternating current frequency driven synchronous contacting vibrator.

Still another more specific object of the present invention is to provide a new and improved apparatus wherein a first alternating current driven synchronous contacting vibrator produces a direct current which is proportional to an alternating current frequency of the driving signal and this direct current is in turn converted to an alternating current signal to be used in the effecting of the adjustment of a balancing potentiometer whose output potential will balance the direct current potential produced by the first mentioned alternating current driven synchronous vibrator.

The various features of novelty which characterize the invention are pointed out with particularity in the claims annexed hereto and forming a part of this specification. For a better understanding of the invention, its advantages, and specific objects attained with its use, reference should be had to the accompanying drawings and descriptive matter in which is illustrated and described a preferred embodiment of the invention.

Referring to the single figure, the numerals 10 and 11 represent a suitable alternating current power line whose alternating frequency is to be measured. Connected across the power line is a transformer 12 having a primary winding 13, and a secondary winding 14. The secondary winding 14 is connected to supply a driving signal for a synchronous contacting vibrator 15. This vibrator comprises a driving coil 16, a single pole double throw switch blade 17, and a pair of fixed contacts 18 and 19. This synchronously driven vibrator 15 may well take the form of the vibrator disclosed in the patent to F. W. Side, No. 2,423,524, issued July 8, 1947.

A condenser 20 is arranged for connection to the blade 17 and this condenser 20 has a temperature compensating resistor 21 connected in series therewith. Connected to the other end of the resistor 21 are a pair of fixed resistors 22 and 23 which are connected in series with each other and in series with a third span adusting resistor 24.

The resistors 22, 23, and 24 are connected across the input of a filtering network 25 which includes a resistor 26, a condenser 27, a resistor 28, a condenser 29, a resistor 30, and a condenser 31.

Also connected to the power line 11 is a further transformer 35. This transformer includes a primary winding 36 and a secondary winding 37, the latter of which is connected to supply driving energy to a further synchronously driven contacting vibrator 38 which may take the same form as the vibrator shown at 15. This vibrator includes a driving coil 39, a single pole double throw switch blade 40, and a pair of fixed contacts 41 and 42. The vibrator 38 acting with a transformer 42A serves to convert the direct current signal into an alternating current signal in the manner fully explained in the above-mentioned Side patent. The transformer 42A includes a primary winding 43 which is tapped at 44 and a secondary winding 45, the latter of which is connected to the input of a suitable alternating current amplifier motor drive circuit 46. The vibrator 38, transformer 42A, and amplifier 46 may well take the form of the apparatus disclosed in the patent to Walter P. Wills, 2,423,540, issued July 8, 1947.

The input to the vibrator 38 is by way of a choke 47 having a pair of windings 48 and 49. A pair of condensers 50 and 51 are connected across the output of the choke 47 and the junction between the two condensers as well as the core of the choke 47 is grounded so as to eliminate the effects of unwanted signals on the input to the vibrator 38.

The output of the amplifier 46 will appear as an alternating current signal on the control winding 55 of reversible motor 56. A line winding for the motor 56 is provided at 57 and this winding has a suitable phase shifting condenser 58 in series therewith. The motor 56 is used to supply the motivating power for the slider 65 which cooperates with a potentiometer slidewire resistor 66 The resistor 66 has a shunting resistor 67 in parallel therewith and a pair of voltage dropping resistors 68 and 69 in series therewith. Connected to the potentiometer slider 65 is a suitable dart or indicator 70 which cooperates with a suitable indicating scale 71 which may be calibrated directly in frequency units of the alternating current frequency which is to be measured.

The direct current source of potential for the measuring circuit is derived from a suitable direct current source, such as a battery 75. This battery has a resistor 76 in series therewith and a condenser 77 in parallel therewith, the latter serving to stabilize the source 75 to prevent transients from affecting the accuracy of the frequency measurement.

In considering the operation of the present apparatus, it should first be noted that the synchronous vibrator 15 has its driving coil 16 energized directly by the alternating current frequency signal originating from the power lines 10 and 11. This driving alternating current signal will be effective to drive the blade 17 so as to alternately contact the contacts 18 and 19 at a rate which is the same as the driving frequency applied to the driving coil 16. The contacting time of the blade 17 with the respective contacts 18 and 19 may be variably selected but is preferably arranged so that the blade is engaged with the respective contacts for approximately 25 percent of each cycle for contact 18 and 25 percent for each cycle for contact 19.

When the switch blade is driven in an upward direction so as to engage the contact 18, the condenser 20 is connected in a charging circuit with the battery 75 and this circuit may be traced from the upper terminal of the battery 75 through resistor 76, conductor 80, conductor 81, contact 18, blade 17, conductor 82, condenser 20, resistor 21, resistor 23, and conductor 83 back to the lower terminal of the battery 75. The time constant of this last traced circuit is selected so that the condenser 20 will be charged to substantially the full voltage of the source 75. This will mean that there is produced across the resistor 23 a direct current pulse which pulse will be applied to the input of the filter 25.

On the next half cycle of the alternating frequency, the blade 17 will be driven downwardly to engage the contact 19 and the condenser 20 will be connected in a discharging circuit that may be traced from the upper terminal of the condenser 20 through lead 82, blade 17, contact 19, conductor 84, resistor 24, resistor 22, and resistor 21 back to the lower terminal of the condenser 20. The time constant of this discharge circuit corresponds to the time constant of the charging circuit and therefore there will also be produced in this discharge circuit across the resistors 22 and 24 a direct current pulse which will be of the same polarity as the pulse produced during the charging operation on the resistor 23. This pulse will likewise appear on the input of the filter 25.

The direct current pulses on the input of the filter 25 due to the charging and discharging action of the condenser 20 will be averaged out on the output terminals 85 and 86 of the filter. There will thus appear a direct current potential on the output leads 85 and 86 which is directly proportional to the alternating current frequency which is driving the synchronous vibrator 15. This direct current voltage on the leads 85 and 86 is compared with the direct voltage originating from the slider 65 of the balancing potentiometer. This potential for the slidewire resistor 66 of the balancing potentiometer is derived in a circuit that may be traced from the upper terminal of the battery 75 through conductors 80, 87, resistor 68, slidewire resistor 66, resistor 69, and conductors 86 and 83 back to the lower terminal of the battery 75. The direct current potential on the lead 85 is applied to the choke coil 48 to the switch blade 40 of the vibrator converter 38. The potential of the slidewire resistor slider 65 is applied by way of choke coil 49 to the tap 44 of the transformer winding 43. If there is a difference in the magnitudes of the direct current potentials applied to the blade 40 and the tap 44, there will be an alternating current signal produced by the vibrating action of the blade 40 as it vibrates between the contacts 41 and 42 and the alternating current produced in the winding 43 will be applied to the input of the amplifier 46 by way of the transformer 42A. The amplifier will in turn amplify this signal and produce a motor drive signal which will energize the motor control winding 55 and cause the rotor of the motor 56 to be driven in a direction to move the slider 65 to a position which will balance the input direct current signal unbalance between the slider 65 and the filter output lead 85.

If the frequency of the alternating current power supply on lines 10 and 11 should decrease, the synchronously driven vibrator 15 will follow this decrease and will produce a smaller number of pulses applied to the input of the filter 25. This will mean that the voltage appearing on the output of the filter on leads 85 and 86 will be decreased. The decrease will result in an unbalance on the input of the vibrator converter 38 and there will be a resultant motor drive signal causing the motor 56 to drive the slider in an upward direction so as to provide a balancing signal. As will be readily apparent, the output operation of the motor 56 may also be used to produce the desired controlling action as well as provide the indication obtained by the use of the dart 70 movable over the scale 71.

If the frequency of the alternating current on the power lines 10 and 11 should increase, the operation assumed above upon a decrease will be just reversed and the motor 56 will be effective to drive the slider 65 in the opposite direction and provide a balancing signal.

In one particular form of the invention, the frequency measuring apparatus was found to be accurate and sensitive to 0.02 cycle per second. This enabled the apparatus to have a full span of two cycles when used in the combination of a potentiometric measuring circuit such as disclosed in the above-mentioned Wills patent. In other words, at 60 cycles, with the 60 cycle signal centered in the measuring instrument, the instrument would operate full scale between 59 and 61 cycles per second.

As the instrument may be exposed to varying temperature conditions, the condenser 20 may conveniently be compensated for ambient temperature variations. This compensation may be effected in many ways with the particular temperature compensating resistor 21 being shown connected in series with the condenser both during the charging and discharging operation. If desired, the temperature compensating resistor may be connected in series with either of the resistors 22 or 23 in a manner so that the compensating action will change the RC time constant of the circuit to balance the changes normally occurring due to a shift in the capacity of the condenser 20.

It should also be noted that the operation of the present frequency measuring apparatus is linear with respect to changes in frequency. The principal reason for the linearity is due to the fact that the apparatus uses pulses of substantially constant amplitude rather than pulses of varying amplitude as frequently used by prior art devices of this general nature. The constant amplitude pulse is provided by selecting the time constant of the charge and discharge circuit for condenser 20 to be shorter than the contacting time of the synchronous vibrator 15. Thus, only the pulse rate varies with changes in frequency which results in linear variations. By incorporating this linear feature, it is possible to shift the circuits of the instrument to various frequency measuring ranges without appreciable modification of the instrument.

The present invention is also free of wave form distortion or error due to the synchronous vibrator 15 eliminating the effects of harmonics present on the alternating current line. Another advantage of the present invention is that the power consumed by the direct frequency measuring portion is due solely to the loading action of the coil 16, which loading action is negligible. In addition, the circuit is one which may be readily calibrated in manufacture and in the field since simple bridge calibration techniques are all that are required.

While, in accordance with the provisions of the statutes, there has been illustrated and described the best forms of the invention known, it will be apparent to those skilled in the art that changes may be made in the form of the apparatus disclosed without departing from the spirit of the invention as set forth in the appended claims, and that in some cases certain features of the invention may be used to advantage without a corresponding use of other features.

Having now described my invention, what I claim as new and desire to secure by Letters Patent is:

1. An alternating current frequency measuring apparatus comprising, a synchronous contacting vibrator having a contact driving means arranged for direct connection to an alternating current source whose frequency is to be measured, a source of direct potential, a condenser, a resistance circuit, a pulse averaging circuit connected to said resistance circuit, circuit means including said resistant circuit and contacts of said vibrator alternately connecting said condenser through a first portion of said resistance circuit to said source of direct potential and to a discharging circuit including a second portion of said resistance circuit to produce on said averaging circuit a direct signal potential proportional to the alternating current frequency, and a potentiometric indicating circuit having an input connected to said averaging circuit, said indicating circuit including a source of variable balancing voltage connected to produce a direct potential on said output to balance the direct potential on said averaging circuit.

2. Apparatus for measuring the frequency of an alternating voltage source, comprising, a synchronous contacting vibrator having a contact driving means connected to be energized by the alternating voltage source, a source of direct potential, a condenser, an impedance circuit, circuit means including contacts of said synchronous vibrator alternately connecting said condenser in a charging circuit with said source of direct potential by way of a first portion of said impedance circuit and in a discharging circuit with a second portion of said impedance circuit so as to produce on said impedance circuit a direct potential proportional to the alternating voltage source frequency, and a self balancing potentiometric measuring circuit connected to said impedance circuit to measure the direct potential thereon.

3. An alternating current frequency measuring apparatus comprising, a synchronous alternating current driven contacting type vibrator having an energizing winding adapted for direct connection to a source of alternating current, said vibrator comprising a single pole double throw switch, a condenser, a direct current source of potential, circuit means including a first resistor and the single pole double throw switch of said synchronous vibrator connecting said condenser in a charging circuit to said direct current source of potential during one half cycle of the alternating current supply frequency, circuit means including the single pole double throw switch of said synchronous vibrator connecting said condenser in a discharging circuit through a second resistor on the alternate half cycle of the alternating current supply frequency, means connecting said first and second resistors in series to a filtering network, said filtering network having a direct current output potential proportional to the alternating current supply frequency, and a direct current potential measuring means connected to said filter network, said measuring means being calibrated in units of alternating current frequency.

4. An alternating current frequency measuring apparatus as defined in claim 3 wherein said direct current potential measuring means comprises a self-balancing potentiometer circuit whose balancing potentiometer is energized by said source of direct current potential.

5. An alternating current frequency measuring apparatus comprising, a synchronous alternating current driven contacting type vibrator having an energizing winding adapted for direct connection to a source of alternating current, said vibrator comprising a single pole, double throw switch whose contacting time during each half cycle is less than the period of one half cycle of the alternating current power supply, a condenser, a direct current source of potential, circuit means including a first resistor and the single pole double throw switch of said synchronous vibrator connecting said condenser in a charging circuit to said direct current source of potential during one half cycle of the alternating current supply frequency, circuit means including the single pole double throw switch of said synchronous vibrator connecting said condenser in a discharging circuit through a second resistor on the alternate half cycle of the alternating current supply frequency, circuit means connecting said first and second resistors in series to the input of a filtering network, said filtering network having an output with a direct current potential thereon proportional to the alternating current supply frequency, a second synchronously driven vibrator producing an alternating current proportional to the direct current potential on the output of said filtering network, a reversible motor connected to be driven by said alternating current signal, a balancing potentiometer energized by said source of direct current potential and connected to be variably adjusted by said reversible motor, and circuit means connecting the output of said balancing potentiometer to balance the direct current signal on the output of said filtering network.

6. Apparatus as defined in claim 5 wherein said first and second resistors and said condenser in the respective charge and discharge circuits have a time constant less than the contacting time of said synchronous vibrator so that pulses of uniform amplitude are produced on the input of said filtering network.

References Cited in the file of this patent

UNITED STATES PATENTS

| | | |
|---|---|---|
| 2,375,158 | Wills | May 1, 1945 |
| 2,473,542 | Philpott | June 21, 1949 |
| 2,475,362 | Tinkham | July 5, 1949 |
| 2,476,025 | Clark | July 12, 1949 |
| 2,512,702 | White | June 27, 1950 |
| 2,523,297 | Hastings | Sept. 26, 1950 |
| 2,622,192 | Tarpley | Dec. 16, 1952 |

FOREIGN PATENTS

| | | |
|---|---|---|
| 1,033,561 | France | Apr. 8, 1953 |